United States Patent
Uphaus

[11] Patent Number: 5,411,122
[45] Date of Patent: May 2, 1995

[54] CONE RAMP CLUTCH
[75] Inventor: Roderick N. Uphaus, Richmond, Ind.
[73] Assignee: Hoffco, Inc., Richmond, Ind.
[21] Appl. No.: 66,464
[22] Filed: May 24, 1993
[51] Int. Cl.[6] .................. F16D 13/28; F16D 23/12
[52] U.S. Cl. .................. 192/66; 192/93 A; 192/110 B
[58] Field of Search .......... 192/93 A, 66, 52, 110 B, 192/18 R; 56/11.8

[56] References Cited

U.S. PATENT DOCUMENTS

| | | | |
|---|---|---|---|
| 203,808 | 5/1878 | Williamson . | |
| 430,097 | 6/1890 | Watson . | |
| 528,780 | 11/1894 | King | 192/93 A X |
| 812,694 | 2/1906 | Spencer . | |
| 1,008,792 | 11/1911 | Davis | 192/66 X |
| 1,438,486 | 12/1922 | Gorman | 192/93 A |
| 2,260,770 | 10/1941 | Brownlee | 192/66 X |
| 2,665,787 | 1/1954 | Ribich | 192/93 A |
| 2,931,476 | 4/1960 | Zeidler et al. | 192/93 A X |
| 3,127,969 | 4/1964 | Hansen | 192/93 A |
| 3,270,842 | 9/1966 | Pinto . | |
| 3,289,800 | 12/1966 | Strong . | |
| 3,386,545 | 6/1968 | Hansen | 192/93 A X |
| 4,189,038 | 2/1980 | Hurst . | |
| 4,205,509 | 6/1980 | Miyazawa et al. . | |
| 4,212,379 | 7/1980 | Zoino . | |
| 4,213,521 | 7/1980 | Modersohn | 192/93 A X |
| 4,332,572 | 6/1982 | Carlson et al. . | |
| 4,466,233 | 8/1984 | Thesman | 192/18 R X |
| 5,002,259 | 3/1991 | Manning et al. . | |

FOREIGN PATENT DOCUMENTS 336016  10/1930  United Kingdom ............ 192/93 A Primary Examiner—Rodney H. Bonck
Attorney, Agent, or Firm—Barnes & Thornburg

[57] ABSTRACT

A cone-type clutch is provided having a cone-shaped housing coupled to a drive shaft for engaging a cone-shaped friction cone coupled to a driven shaft to establish a driving connection between the shafts. The clutch is activated by rotating two actuating levers relative to each other to engage opposing ramp surfaces and separate the actuating levers axially in order to force contact between the cone-shaped housing and friction cone.

36 Claims, 2 Drawing Sheets

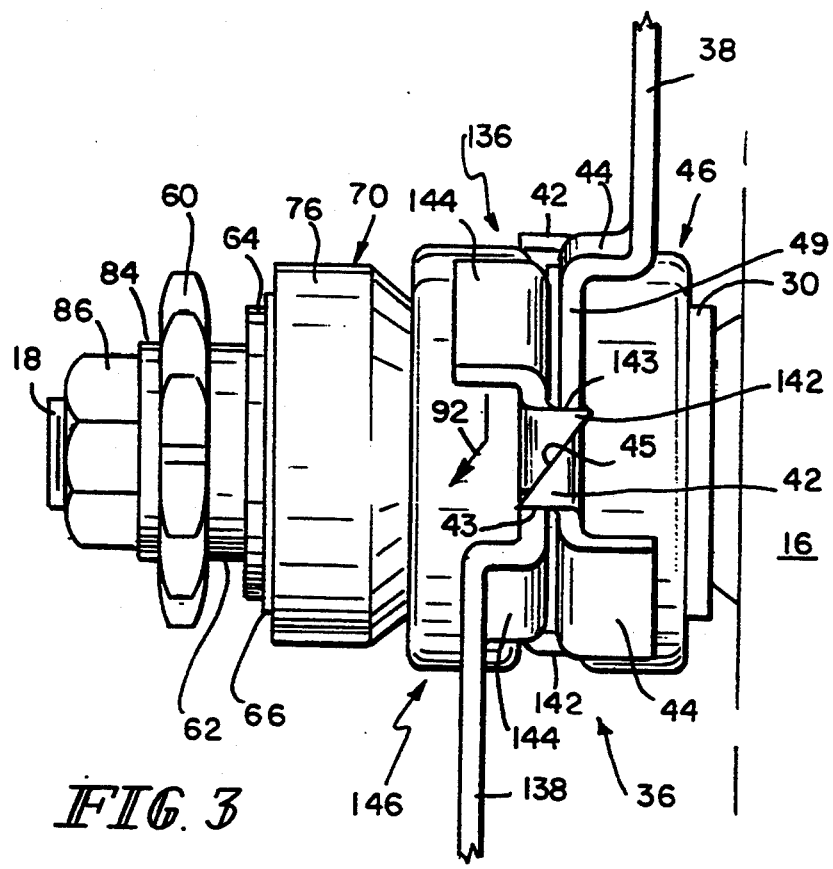
FIG. 3
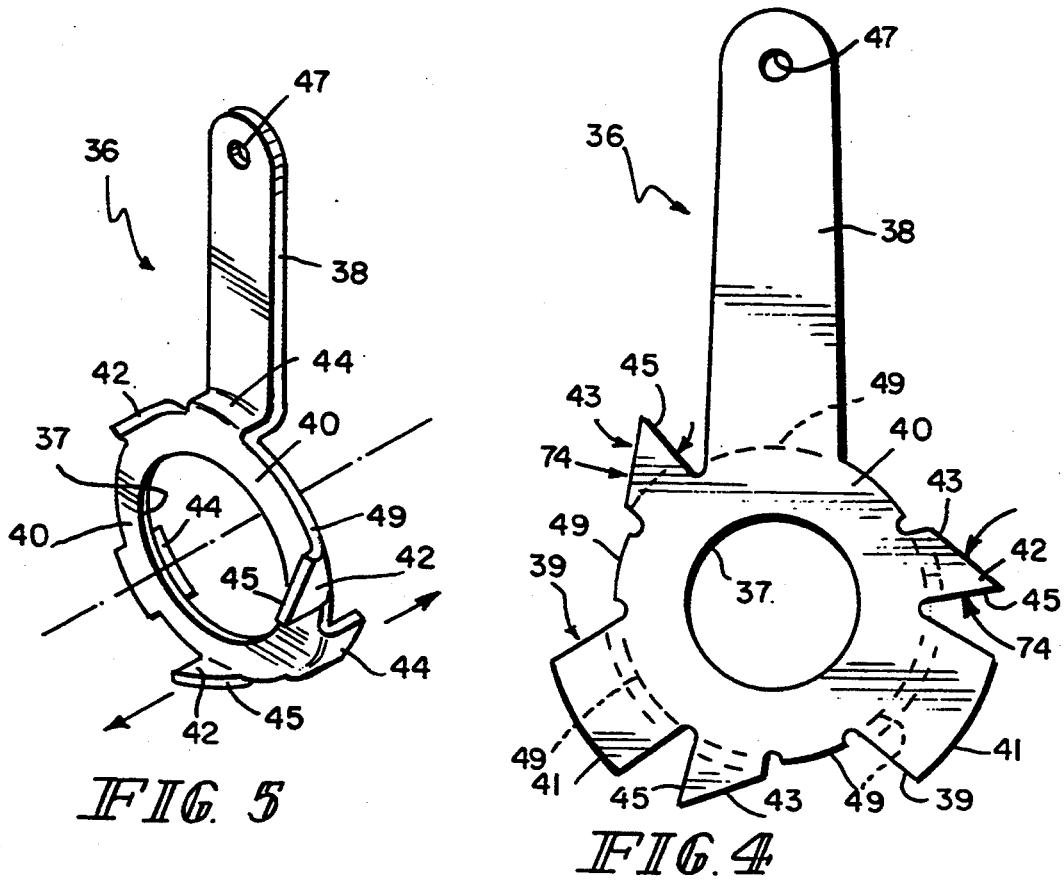
FIG. 5
FIG. 4

CONE RAMP CLUTCH

BACKGROUND AND SUMMARY OF THE INVENTION

The present invention relates to clutch mechanisms for selectively transmitting power from a drive shaft to a driven shaft, and particularly to a cone-type clutch having a cone-shaped housing coupled to a drive shaft for engaging a cone-shaped friction cone coupled to a driven shaft to establish a driving connection between the shafts. More particularly, the invention relates to a cone clutch that is activated by rotating two actuating levers relative to each other to engage opposing ramp surfaces and separate the actuating levers axially in order to force contact between the cone-shaped housing and friction cone.

Clutches for use with engine-driven machines, such as self-propelled lawn mowers, are known. Typically, an operator stands behind a self-propelled lawn mower and moves a shift lever to engage a clutch mechanism to transmit power from the lawn mower engine to the lawn mower drive wheels. For example, lawn mower clutches are disclosed in U.S. Pat. Nos. 4,205,509; 3,289,800; and 3,270,842. Cone clutches are disclosed in U.S. Pat. Nos. 4,212,379; 4,189,038; and 203,308. A friction clutch is disclosed in U.S. Pat. No. 430,097 to Watson.

Unfortunately, most conventional clutches of the type provided on lawn mowers are either fully engaged to turn the drive wheels or fully disengaged to disconnect the rotating drive shaft and the wheels. Movement of the shift lever by the operator causes the clutch to move either into, or out of, engagement without any partial engagement. This action can cause the lawn mower to "lurch" forward whenever the clutch is engaged. Many operators are unsatisfied with lawn mowers that tend to lurch forward when the clutch is engaged. A clutch mechanism that would permit an operator to engage the clutch gradually using the shift lever would be well-received by consumers and would be a substantial improvement over conventional clutches.

According to the present invention, a clutch assembly is provided for transmitting power from a drive shaft to a driven mechanism. The clutch assembly includes an assembly shaft coupled to the drive shaft, output means for transmitting power, and means for coupling the assembly shaft to the output means. The coupling means includes a first member that is coupled to the assembly shaft for axial movement relative to the assembly shaft and a second member movably coupled to the assembly shaft for axial and rotational movement relative to the assembly shaft.

In preferred embodiments, the first member of the coupling means includes a cone housing mounted on the assembly shaft for axial movement along the assembly shaft during actuation of the clutch assembly. The output means includes a sprocket coupled to an outer end of the assembly shaft and arranged so that the cone housing lies between the drive shaft and the cone housing. The second member of the coupling means includes a friction cone coupled to the sprocket and oriented to move toward and engage the clutch housing during actuation of the clutch assembly.

The cone housing includes an annular sleeve portion engaging the assembly shaft and a frusto-conical portion having an axially outwardly opening aperture sized to receive the cone-shaped friction cone therein. Means is provided for locking the cone housing to the assembly shaft to block rotation of the cone housing relative to the assembly shaft while allowing axial relative movement between the cone housing and the assembly shaft during actuation of the clutch assembly.

A pair of rotatable actuating levers is used to provide means for moving the cone housing into engagement with the friction cone. Each actuating lever includes a lever arm, a central hub, triangular tabs, rectangular tabs, and an annular thrust bearing. Each central hub is formed to include a central opening receiving the annular sleeve portion of the cone housing therein so that the lever arms are pivotable about the longitudinally extending axis of the cone housing. The triangular tabs are formed on the central hub so as to project orthogonally to the central hub and parallel to the longitudinal axis of the assembly shaft. The rectangular tabs are formed on the central hub so as to extend parallel to the longitudinal axis of the assembly shaft and away from the triangular tabs. The rectangular tabs are sized and positioned to retain the annular thrust bearing in place adjacent the central hub.

The actuating levers are mounted for pivoting movement on the cone housing and arranged so as to position the central hubs adjacent each other and between the thrust bearings. The triangular tabs on one actuating lever are arranged to lie in direct opposing relationship to the triangular tabs on the other actuating lever. The actuating levers are arranged on the annular sleeve portion of the cone housing so as to position the cone housing between the actuating levers and the friction cone with the axially outwardly opening aperture of the cone housing opening toward the friction cone.

When the actuating levers are moved relative to one another, the opposing triangular tabs on the actuating levers will cam on each other and cause the actuating levers to separate gradually. As the actuating levers separate and thereby moving in axially opposite directions along the longitudinal axis of the assembly shaft, the cone housing is pushed in an axially outward direction into engagement with the friction cone by the camming action of the triangular tabs. This outward movement of the cone housing causes the friction cone and cone housing to engage gradually and transmit power from the drive shaft to the sprocket and, in turn to drive wheels of the lawn mower. Thus, the camming action of the triangular tabs provides for a gradual engagement of a drive mechanism, and thereby provides a substantial improvement over conventional lawn mower clutch assemblies.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 3 is a top plan view of the clutch assembly of FIG. 2 showing movement of the triangular tab ramps on the actuating levers to urge the cone housing to the left and into contact with the friction cone to engage the clutch assembly;

FIG. 4 shows a plan view of an actuating lever arm, three triangular tabs arranged around the perimeter of the central hub, and thrust bearing engaging tabs extending from the central hub prior to formation of a completed actuating lever; and FIG. 5 is a perspective view of the actuating lever of FIG. 4, showing the three thrust bearing engaging tabs extending axially to the right and three triangular tabs extending axially to the left.

DETAILED DESCRIPTION OF THE DRAWINGS

Figures 1, 2:
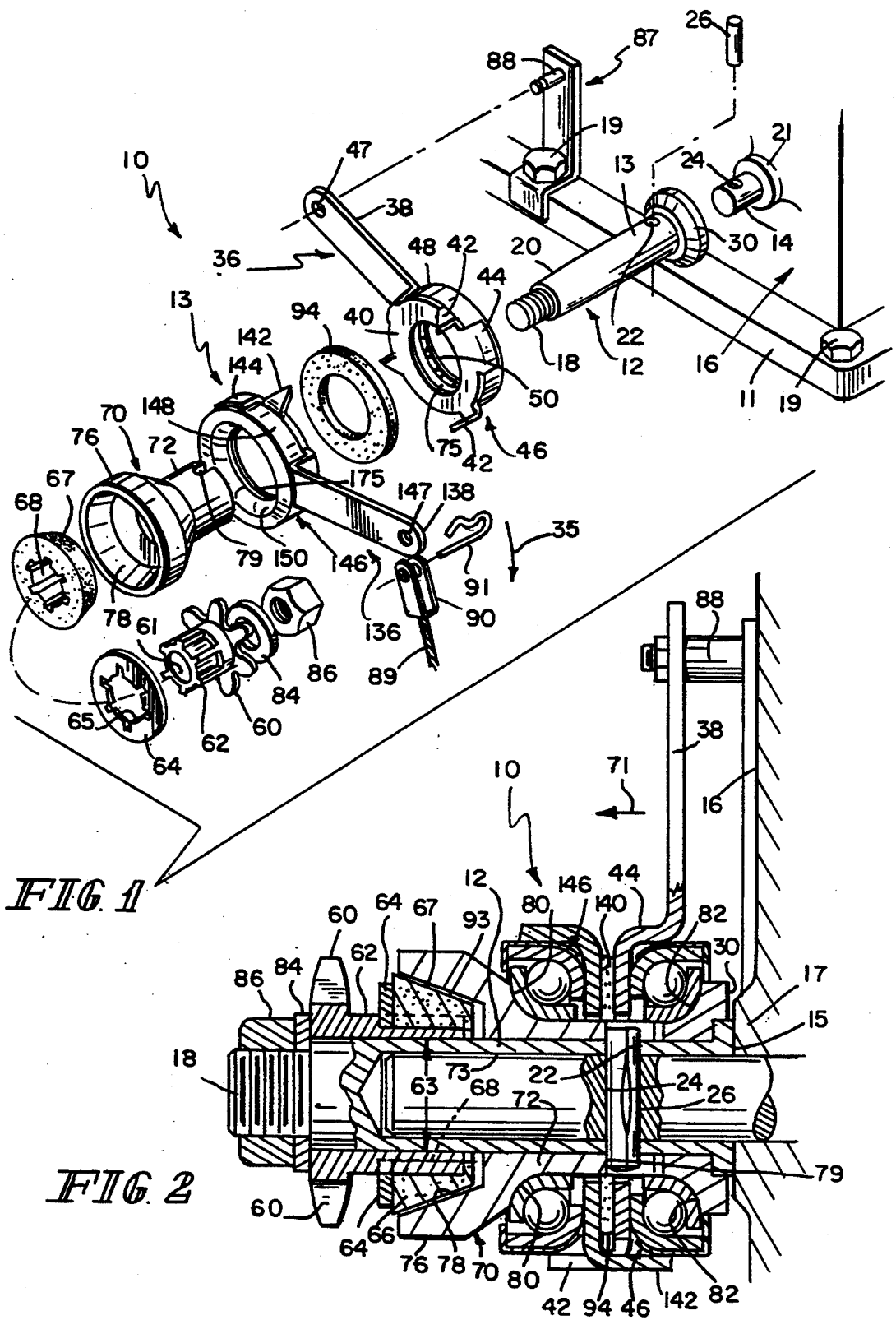
FIG. 1 is an exploded perspective view of a cone ramp clutch assembly according to the present invention showing an assembly shaft having an outer end carrying a wheel sprocket and an inner end coupled to a drive shaft, a friction cone, a cone housing, a first actuating lever with triangular tabs facing to the right, a second actuating lever with triangular tabs facing to the left, and a ring of resilient material between the first and second actuating levers.
FIG. 2 is a longitudinal section view of the clutch assembly of FIG. 1 after it has been assembled and showing the clutch assembly in a disengaged position wherein the friction cone is slightly offset axially and away from the surrounding cone housing.

A clutch assembly 10 constructed according to the present invention is shown in FIG. 1-3. The clutch assembly 10 includes an assembly shaft 12, a cone housing 70, a friction cone 66, an output sprocket 60, and a pair of actuating levers 36 and 136.

A drive shaft 14 extends from an engine 16 having a base member 11. The base member 11 is typically mounted on a driven mechanism such as a lawn mower (not shown) by a plurality of bolts 19. The drive shaft 14 extends through an aperture 21 in the engine 16 and is coupled to the drive shaft 14.

The assembly shaft 12 couples the clutch assembly 10 to the drive shaft 14 of an engine 16. Assembly shaft 12 includes an inner end 13 having a radially outwardly projecting flange 15 extending therefrom (FIG. 2), a threaded distal end portion 18, and cylindrical sleeve portion 20 for engaging the drive shaft 14. The inner diameter of the cylindrical sleeve portion 20 is substantially equal to the outer diameter of the drive shaft 14 to allow the sleeve portion 20 to fit over the drive shaft 14.

The sleeve portion 20 includes a first groove pin-receiving aperture 22 located at the inner end 13 of the assembly shaft 12. The first grove pin-receiving aperture 22 is axially aligned with a second groove pin-receiving aperture 24 formed in the drive shaft 14. When the groove pin-receiving apertures 22, 24 are aligned, groove pin 26 is inserted in the groove pin-receiving apertures 22, 24 to axially and rotationally lock the assembly shaft 12 to the drive shaft 14. The groove pin 26 is sized to extend beyond the groove pin-receiving aperture 22 (FIG. 2). An annular bearing spacer 30 is positioned on the assembly shaft 12 between the groove pin-receiving aperture 22 and the flange 15 on the inner end 13 of the assembly shaft 12. Bearing spacer 30 includes an annular shoulder 17 (FIG. 2) configured to conformingly engage the flange 15.

A cone housing 70 includes an annular sleeve portion 72 and a frusto-conical portion 76. The annular sleeve portion 72 has an inner diameter 73 substantially equal to the outside diameter 63 of the assembly shaft 12 to pilot the cone housing 70 relative to the assembly shaft 12. The annular sleeve portion 72 also includes a groove pin-receiving slot 79 for engaging the extending ends of the groove pin 26.

The cone housing 70 includes an axially-outwardly facing aperture 78 for receiving the friction cone 66 therein as shown in FIG. 2. The axially outwardly facing aperture 78 is defined by an inner bevelled surface 78 configured to match and engage the complementary bevelled surface 67 of the friction cone 66.

The cone housing 70 is configured to slide over the assembly shaft 12 so as to abut a bearing spacer 30 positioned at the inner end 13 of the assembly shaft 12. Thrust bearings 46, 146, are coupled to the actuating levers 36, 136, respectively, and are rotatably positioned on the cone housing 70 between the bearing spacer 30 and a curved surface 80 joining the frusto-conical section 76 of the cone housing 70 with the annular sleeve portion 72. Thus, the actuating levers 36, 136, are mounted for rotation about the assembly shaft 12. An annular ring 94 of resilient material is positioned between the actuating levers 36, 136 to reduce rattles and minimize intrusion of dirt or other contaminants into the clutch assembly 10.

An output sprocket 60 is coupled to a splined shaft 62 which is mounted to rotate on the assembly shaft 12. The friction cone 66 is coupled to the splined shaft 62 and oriented to engage the cone housing 70 when the sprocket 60 and splined shaft 62 are properly positioned on the assembly shaft 12 and the clutch assembly 10 is actuated. A conventional washer 84 and nut 86 engage a threaded outer end 18 of the assembly shaft 12 to limit the amount of relative axial movement of the output sprocket 60, friction cone 66, and cone housing 70.

Illustratively, the first actuating lever 36 is rigidly attached to the engine 16 by a pin 88 which is coupled to the engine 16 by a bracket 87 bolted to the engine base member 11. The first actuating lever can be coupled to any structural member such as a mower deck or the like. The second actuating lever 136 is free to rotate about the cone housing 70 and is coupled to an actuating cable 89. The actuating cable 89 is attached to an actuating device (not shown) such as a lever attached to a lawn mower push handle (not shown). The actuating cable 89 could be replaced by a rod or the like without departing from the scope of the invention.

Triangular ramps 42, 142 are arranged to cam against one another to engage the clutch in response to relative movement of the actuating levers 36, 136. The triangular ramps 42, 142 are formed on the actuating levers 36, 136, respectively. The actuating levers 36, 136 are mounted on the annular sleeve portion 72 of the cone housing 70 so as to place the triangular ramps 42, 142 in direct opposing and camming relationship. Thus, when the actuating cable 89 is pulled by an operator, the second actuating lever 136 rotates relative to the first actuating lever 36 in the direction of arrow 35 to move the triangular ramps 42, 142 into camming engagement. When the triangular ramps 42, 142 engage, the resulting camming action axially separates the actuating levers 36, 136, thereby pushing the cone housing 70 in direction 71 (See FIG. 2) and into engagement with the friction cone 66. Engagement of the cone housing 70 and friction cone 66 functions to couple the output sprocket 60 to the input drive shaft 14. It will be appreciated that other types of frictions mechanisms, such as disk clutches, can be employed. However, the cone housing and friction cone combination has been found to provide a strong drive force in a small package.

The driven output sprocket 60 is attached to a hollow splined shaft 62, as shown in FIGS. 1-2. The splined shaft 62 has an inside diameter 61 substantially equal to the outside diameter 63 of the assembly shaft 12 and rotates about the assembly shaft 12. A washer 64 has a central aperture 65 that is sized and configured to fit the splined shaft 62. A frusto-conical friction cone 66 includes a central aperture 68 configured to engage the splined shaft 62 and is positioned in abutting relation to the washer 64. The friction cone 66 includes a bevelled surface 67 oriented to face away from the sprocket 60 and toward the axially outwardly opening aperture.

Two substantially identical actuating levers 36 and 136 are configured to rotate about the annular sleeve portion 72 of the cone housing 70. As perhaps best seen in FIG. 5, each actuating levers 36, 136 (illustratively lever 36 in FIG. 5) includes a central aperture 37, a lever arm portion 38, 138, a central hub 40, 140, a plurality of triangular ramp portions 42, 142, and a plurality of rectangular bearing-retaining portions 44, 144, respectively. Illustratively, three ramp portions 42, 142 are equally spaced about the circumference of the central hub 40, 140, respectively, to provide a stable, three-point camming action. It will be appreciated, however, that any number of ramp portions 42, 142 may be used.

Each ramp portion 42, 142 includes a first surface 43, 143 extending parallel to the longitudinal axis of the assembly shaft 12 and a second surface 45, 145 intersecting the first surface 43, 143 at an acute angle 74. As can be seen in the plan view of FIG. 4, the triangular ramp portions 42, 142 extend radially outwardly from the perimeter 49, 149 of the central hub 40, 140. This permits the radially inwardly facing surface of the bent ramp portions 42, 142 to be radially positioned outside the perimeter 49, 149 of the central hub 40, 140. This spacing of the ramp portion 42, 142 allows opposing ramp portions 42, 142 to fully engage each other without interference from the central hub 40, 140, as shown in FIGS. 2–3.

The rectangular bearing-retaining portions 44, 144 include parallel side edges 39 and an arcuate edge 41. As can be seen in the plan view of FIG. 4, the bearing-retaining portions 44, 144 extend radially outwardly from the perimeter 49, 149 of the central hub 40, 140. Of course, the outward extension, if any, of the bearing-retaining portions 44, 144 will depend on the diameter of bearings to be retained.

The ramp portions 42, 142 and the bearing-retaining portions 44, 144 alternate around the circumference of central hub 40, 140 and extend orthogonally from the central hub 40, 140 in opposite directions. Thus, the triangular ramp portions 42, 142 extend from one side of the central hub 40, 140 and the rectangular bearing-retaining portions 44, 144 extend from the other.

The lever arm portion 38, 138 of each actuating lever 36, 136 extends orthogonally from one of the rectangular bearing-retaining portions 44, 144 so as to extend in a plane parallel to the plane of its respective central hub 40, 140. Each lever arm 38, 138 also includes an aperture 47, 147 formed in the distal end thereof.

Each actuating lever 36, 136 is coupled to a thrust bearing assembly 46, 146, respectively. Illustratively, the thrust bearing assembly 46, 146 is a ball bearing assembly, but it will be appreciated that any suitable thrust bearing can be used. The rectangular bearing-retaining portions 44, 144 are sized and positioned to engage the outer race 48, 148 of the thrust bearing assembly 46, 146, respectively, so as to position the thrust bearing assembly 46, 146 adjacent the central hub 40, 140 and orient the inner race 50, 150 to face axially away from the triangular ramps 42, 142.

As best seen in FIG. 2, the cone housing 70 includes an outer curved surface 80 at the juncture between the frusto-conical portion 76 and the annular sleeve portion 72. A mirror image curved surface 82 is formed on the bearing spacer 30. The surfaces 82, 80 are configured to be complementary to the outer surface of the inner race 50, 150 of the thrust bearings 46, 146, respectively.

The inner diameter 75, 175 of the inner race 50, 150 is substantially equal to the outer diameter of annular sleeve portion 72 of the cone housing 70. Thus, the thrust bearings 46, 146 can be slid over the annular sleeve portion 72 to place the inner race 50, 150 in abutment with the curved surface 82, 80, respectively. Consequently, when the actuating levers 36, 136 are coupled to a thrust bearing 46, 146, the levers 36, 136 can be rotatably coupled to the assembly shaft 12.

With the bearing spacer 30 positioned to abut the flange 15 at the inner end 13 of the assembly shaft 12, the clutch assembly 10 is assembled and coupled to the engine by sliding the assembly shaft 12 over the drive shaft 14 so as to align the groove pin-receiving apertures 22, 24, and inserting the groove pin 26 therethrough. The actuating levers 36, 136 are joined to the thrust bearings 46, 146. The bearings 46, 146 are positioned on the cone housing 70 between the curved surface 80 and the annular bearing spacer 30 and oriented so as to place the actuating levers 36, 136 in back-to-back relation to place their respective triangular ramp portions 42, 142 in an opposing relationship. A ring 94 of cushioning material, such as rubber or foam, can be positioned between the annular flat portions 40. Advantageously, the cushioning material 94 reduces rattles associated with a disengaged clutch and restricts entry of debris between the actuating levers which might otherwise affect the clutch's ability to disengage.

The cone housing 70, with the actuating levers 36, 136, is positioned on the assembly shaft 12 to allow the groove pin-receiving slot 78 to receive the extended ends of the groove pin 26. When the cone housing 70 is so engaged with the groove pin 26, as shown in FIG. 2, the inner races 50, 150 of the thrust bearings 46, 146 are in abutting relation with curved surfaces 80, 82 of the cone housing 70 and the bearing spacer 30 and the actuating levers 36, 136 are rotatably coupled to the annular sleeve portion 72. The friction cone 66 and the washer 64 are coupled to the sprocket 60 and hollow splined shaft 62 and are positioned on the assembly shaft 12 distal to the cone housing 70. A washer 84 and nut 86 are positioned adjacent the sprocket 60 and the nut threadedly engages the threaded end portion 18 of the assembly shaft 12.

The aperture 47, 147 formed in the lever arm 38, 138 is aligned to engage the holding pin 88. A cable 89 is coupled to the actuating lever 136 by a clevis pin 90 or other device held in place by a cotter pin 91 to connect the lever arm 136 to a lever (not shown) for operator actuation of the clutch 10.

A slight gap 93 exists between the cone housing 70 and the friction cone 66 in the disengaged position as seen in FIG. 2. Thus, there is room for axial movement between the cone housing 70 and friction cone 66 to allow for complete disengagement.

The triangular ramps 42, 142 formed on the actuating levers 36, 136 and their positioning relative to each other are best seen in FIG. 3. It will be appreciated, as seen in FIG. 3, that holding the lever arm 36 stationary and rotating the lever arm 136 will produce relative movement between the triangular ramps 42, 142. The relative movement between the ramps 42, 142 causes the ramps 42, 142 to cam on each other and transmit an axial force, through the thrust bearings 46, 146 along the longitudinal axis of the assembly shaft 12. Since the thrust bearing 46 abuts the bearing spacer 30 which is axially blocked by the flange 15, the thrust bearing 146 is moved axially away from the engine 16. Thus, the actuating lever 136 follows a path indicated by arrow 92 (FIG. 3).

In moving axially away from the engine 16, the actuating lever 136 and thrust bearing 146 push against the cone housing 70 and push it toward the distal end of the assembly shaft 12. The cone housing 70 engages the friction cone 66 and pushes the friction cone 66 ahead of it. The friction cone 66, in turn, pushes the washer 64 against the shaft 62, thereby urging the sprocket 60 into an abutting relationship with the washer 84 which defines the end of the axial movement for the sprocket 60, washer 64, and friction cone 66. As the actuating lever 136 continues to rotate relative to the actuating lever 36, the cone housing 70 is pushed to ever increasing engagement with the friction cone 66, causing the friction cone 66 to rotate with the engagement member. Because the sprocket 60 rotates with the friction cone 66, and since the cone housing 70 is rotationally locked to the drive shaft by engagement with of groove pin 26 and groove pin-receiving slot 79, engagement of the friction cone 66 by the cone housing 70 effectively causes the sprocket 60 to rotate with the drive shaft 14.

An actuating lever (illustratively lever 36) is shown in FIG. 4 as it appears before the triangular ramps 42, 142 and rectangular bearing-retaining portions 44, 144 are bent orthogonally from the central hub 40, 140. In the illustrated embodiment, three triangular ramps 42 are approximately equally spaced around the circumference of the annular portion 40. Although any number of ramps 42 can be used, three equally spaced ramps 42 provide a stable transmission of the axial forces along the assembly shaft 12. Moreover, by alternating the ramps 42 with the bearing-retaining portions 44 around the circumference of the annular portion 40, the axial forces generated by the relative movement between the ramps 42 are balanced around the thrust bearings 46.

The actuating lever 36 showing the bent triangular ramps 42 extending from one side of the central hub 40 and the bent rectangular thrust bearing-retaining portions 44 extending from the other side of the central hub 40, is shown in the perspective view of FIG. 5. The lever arm 38 projects from a outer end of one of the rectangular thrust bearing-retaining portions 44 and extends parallel to the plane of the central hub 40.

The present invention provides a clutch assembly 10 that allows gradual engagement of the drive wheels of a lawn mower, or the like, in response to relative movement between a pair of actuating levers 36, 136. A friction cone 66, positioned at the outer end of the assembly 10 for engaging a cone housing 70, can be easily removed for replacement without the need to dismantle the entire assembly 10, thus simplifying maintenance of the clutch assembly 10. Moreover, by coupling the friction cone 66 to an output sprocket 60, and allowing the friction cone 66 and sprocket 60 to move axially and rotationally relative to the assembly shaft 12, the assembly is easier and less expensive to build by obviating the need for a locking mechanism to rotationally lock the sprocket 60 and friction cone 66 to the assembly shaft 12.

Although the invention has been described in detail with reference to a certain preferred embodiment, variations and modifications exist within the scope and spirit of the invention as described and defined in the following claims.

I claim:

1. A clutch assembly for transmitting power from a drive shaft to a driven mechanism, the assembly comprising
   means for receiving power from a drive shaft,
   means for transferring power to the driven mechanism, and
   means for connecting the receiving means and the transferring means to transmit power, the connecting means including a thrust bearing assembly and a central hub having triangular camming tabs formed on the central hub to project in a first direction orthogonally from a plane of the central hub and rectangular bearing-retaining tabs formed on the central hub to project in an opposite second direction from the central hub, the bearing-retaining tabs and the triangular tabs being arranged to lie in coextensive relation to one another, the rectangular tabs being situated to define an interior region therebetween, the connecting means further including a thrust bearing assembly mounted in said interior region.

2. The assembly of claim 1, wherein the receiving means includes an assembly shaft coupled to the drive shaft and first means for engaging the transferring means to connect the drive shaft to the transferring means, and the first means is coupled to the assembly shaft.

3. The assembly of claim 2, wherein the first means includes a cone housing and means for coupling the cone housing to the assembly shaft for rotational movement therewith and axial movement relative thereto.

4. The assembly of claim 2, wherein the transferring means includes second means for engaging the assembly shaft to connect the drive shaft to the driven mechanism and the second means is coupled to the assembly shaft for axial and rotational movement relative to the assembly shaft.

5. The assembly of claim 4, wherein the first means includes a cone housing and the second means includes a friction cone positioned at an outer end of the assembly shaft and oriented to engage the cone housing.

6. The assembly of claim 1 wherein the rectangular bearing-retaining tabs are positioned to engage the thrust bearing assembly and retain the thrust bearing assembly in position adjacent to the central hub.

7. The assembly of claim 1, wherein the receiving means includes an assembly shaft and the transferring means includes a friction cone coupled to the assembly shaft for rotational and axial movement relative thereto.

8. The assembly of claim 7, wherein the receiving means includes a cone housing coupled to the assembly shaft for axial movement relative thereto and the connecting means includes means for moving the cone housing relative to the assembly shaft to engage the friction cone.

9. The assembly of claim 8, wherein the friction cone is positioned at an outer end of the assembly shaft and the cone housing is positioned on the assembly shaft to lie between the friction cone and the connecting means.

10. A clutch assembly for transmitting power from a drive shaft to a driven mechanism, the assembly comprising a rotatable assembly shaft having a longitudinal axis, a cone housing slidably coupled to the assembly shaft for axial movement relative thereto and rotational movement therewith, the cone housing being formed to include a central aperture receiving the assembly shaft therein and a cone-receiving chamber communicating with the central aperture and receiving the assembly shaft therein, a friction cone formed to include a central aperture receiving the assembly shaft therein and positioned to lie in the cone-receiving chamber formed in the cone housing for rotational movement relative to the assembly shaft, and output means for transferring power to the driven mechanism, the output means including a splined shaft extending into the central aperture formed in the friction cone to engage the friction cone for rotation therewith and an output sprocket appended to the splined shaft for rotation therewith relative to the cone housing.

11. The assembly of claim 10, wherein the splined shaft lies in an annular space provided between the friction cone and the assembly shaft.

12. The assembly of claim 11, wherein the friction cone is formed to include an internal annular serrated edge defining the central aperture in the friction cone, the assembly shaft includes a cylindrical exterior surface lying in spaced-apart relation to the internal annular serrated to define said annular space therebetween, and the splined shaft includes a splined exterior surface engaging the internal annular serrated edge of the friction cone to cause the splined shaft to rotate with the fraction cone and a smooth interior surface defining a passageway receiving the assembly shaft thereon and engaging the cylindrical exterior surface of the assembly shaft to permit the splined shaft to rotate relative to the assembly shaft about the longitudinal axis.

13. The assembly of claim 11, wherein the splined shaft includes a spline portion having a predetermined diameter and engaging the friction cone and a collar portion lying between the spline portion and the output sprocket, the collar portion has a diameter greater than the predetermined diameter and defines an annular bearing surface facing toward and lying in spaced-apart relation to the friction cone, the output means further includes a washer formed to include aperture means for receiving the splined shaft to lock the washer to the spline portion so that the washer rotates with the splined shaft, and the washer is positioned to lie between and engage the friction cone and the annular bearing surface on the collar portion.

14. The assembly of claim 10, wherein the output sprocket and splined shaft are formed to include a shaft-receiving aperture extending along the longitudinal axis, the assembly shaft extends through the shaft-receiving aperture and includes an axially inner portion lying in the central aperture of the cone housing, an axially outer portion lying outside the shaft-receiving aperture of the output sprocket and splined shaft, and an intermediate portion interconnecting the axially inner and outer portions and passing through the central aperture of the friction cone, and the output means further includes a nut mounted on the axially outer portion of the assembly shaft to limit relative axial movement of the output sprocket, friction cone, and cone housing along the assembly shaft.

15. The assembly of claim 14, wherein the splined shaft includes a spline portion having a predetermined diameter and engaging the friction cone and a collar portion lying between the spline portion and the output sprocket, the collar portion has a diameter greater than the predetermined diameter and defines an annular bearing surface facing toward and lying in spaced-apart relation to the friction cone, the output means further includes a washer formed to include aperture means for receiving the splined shaft to lock the washer to the spline portion so that the washer rotates with the splined shaft, and the washer is positioned to lie between and engage the friction cone and the annular bearing surface on the collar portion.

16. The assembly of claim 10, further comprising actuating means for moving the cone housing along the longitudinal axis into engagement with the friction cone to cause the output sprocket to rotate about the longitudinal axis in response to rotation of the assembly shaft and the cone housing.

17. The assembly of claim 16, wherein the actuating means includes a fixed hub mounted on the assembly shaft and fixed against rotation about the longitudinal axis, a movable hub mounted for rotation about the longitudinal axis and positioned to lie between the fixed hub and a radially outwardly extending flange formed on the cone housing, and camming means on the fixed and movable hubs for axially moving the movable hub along the longitudinal axis and away from the fixed hub to urge the cone housing into engagement with the friction cone so that the output sprocket rotates about the longitudinal axis in response to rotation of the assembly shaft about the longitudinal axis.

18. The assembly of claim 17, wherein the camming means includes a plurality of fixed thin-walled triangular ramp portions spaced about a circumferentially extending edge of the fixed hub and a plurality of mobile thin-walled triangular ramp portions spaced about a circumferentially extending edge of the movable hub and each of the fixed thin-walled triangular ramp portions engages one of the mobile thin-walled triangular ramp portions during rotation of the movable hub about the longitudinal axis to establish a camming relationship therebetween.

19. The assembly of claim 17, wherein each of the fixed and movable hubs includes a perimeter edge, triangular hub-camming tabs appended to the perimeter edge and arranged to project in a first axially extending direction, and rectangular bearing-retaining tabs appended to the perimeter edge and arranged to project in an opposite second axially extending direction.

20. The assembly of claim 19, wherein the rectangular bearing-retaining tabs on each of the fixed and movable hubs are situated to define an interior region therebetween and a thrust bearing assembly is mounted in the interior region of each of the fixed and movable hubs.

21. A clutch assembly for transmitting power from a drive shaft to a driven mechanism, the assembly comprising a rotatable assembly shaft having a longitudinal axis, an output sprocket coupled to the assembly shaft for rotational movement about the longitudinal axis and relative to the assembly shaft, a friction cone coupled to the output sprocket to rotate therewith about the longitudinal axis, a cone housing positioned to extend around the friction cone and coupled to the assembly shaft for axial movement relative thereto and rotational movement therewith, a fixed hub formed to include a central aperture, the assembly shaft being positioned to extend through the central aperture and rotate relative to the fixed hub, and actuating means for camming against the fixed hub to urge the cone housing along the longitudinal axis into engagement with the friction cone so that the friction cone and the output sprocket rotate about the longitudinal axis during rotation of the assembly shaft and the cone housing about the longitudinal axis.

22. The assembly of claim 21, wherein the actuating means includes a movable hub and a thrust bearing assembly in the movable hub and the movable hub includes an annular base wall formed to include a central aperture receiving the assembly shaft therein, a side wall appended to the annular base wall and arranged to retain the thrust bearing assembly in the movable hub, and a plurality of cam ramps arranged to engage the fixed hub in camming relation and to lie in coextensive relation to the side wall.

23. The assembly of claim 22, wherein each cam ramp includes an axially extending edge extending in spaced-apart parallel relation to the longitudinal axis and a diagonally extending cam edge intersecting the axially extending edge and lying at an acute angle relative to the axially extending edge.

24. The assembly of claim 23, wherein each cam ramp includes a curved, thin-walled triangular member having the axially extending and diagonally extending edges and having a curved edge appended to an annular perimeter edge of the annular base wall and arranged to interconnect the axially extending and diagonally extending edges.

25. The assembly of claim 22, wherein the side wall includes a plurality of bearing-retaining portions arranged to lie in circumferentially spaced-apart relation about an annular perimeter edge of the annular base wall and to extend in a first direction in spaced-apart parallel relation to the longitudinal axis and the cam ramps are arranged to lie in circumferentially spaced-apart relation about the annular perimeter edge of the annular base wall and to extend in an opposite second direction in spaced-apart relation to the longitudinal axis.

26. The assembly of claim 25, wherein each bearing-retaining portion is a curved, thin-walled, rectangular member having a pair of spaced-apart axially extending edges and a circumferentially extending edge interconnecting the spaced-apart axially extending edges.

27. The assembly of claim 21, wherein the fixed hub is mounted on the assembly shaft and fixed against rotation about the longitudinal axis and the actuating means further includes a movable hub mounted for rotation about the longitudinal axis and positioned to lie between the fixed hub and a radially outwardly extending flange formed on the cone housing and camming means on the fixed and movable hubs for axially moving the movable hub along the longitudinal axis and away from the fixed hub to urge the cone housing into engagement with the friction cone so that the output sprocket rotates about the longitudinal axis in response to rotation of the assembly shaft about the longitudinal axis.

28. The assembly of claim 27, wherein the camming means includes a plurality of fixed thin-walled triangular ramp portions spaced about a circumferentially extending edge of the fixed hub and a plurality of mobile thin-walled triangular ramp portions spaced about a circumferentially extending edge of the movable hub and each of the fixed thin-walled triangular ramp portions engages one of the mobile thin-walled triangular ramp portions during rotation of the movable hub about the longitudinal axis to establish a camming relationship therebetween.

29. The assembly of claim 27, wherein each of the fixed and movable hubs includes a perimeter edge, triangular hub-camming tabs appended to the perimeter edge and arranged to project in a first axially extending direction, and rectangular bearing-retaining tabs appended to the perimeter edge and arranged to project in an opposite second axially extending direction.

30. The assembly of claim 29, wherein the rectangular bearing-retaining tabs on each of the fixed and movable hubs are situated to define an interior region therebetween and a thrust bearing assembly is mounted in the interior region of each of the fixed and movable hubs.

31. A clutch assembly for transmitting power from a drive shaft to a driven mechanism, the assembly comprising a rotatable assembly shaft having a longitudinal axis, a first clutch member coupled to the assembly shaft for rotational movement about the longitudinal axis and relative to the assembly shaft, a second clutch member coupled to the assembly shaft for axial movement relative thereto and rotational movement therewith and positioned to lie adjacent to the first clutch member, and actuating means for moving the second clutch member along the longitudinal axis into driving engagement with the first clutch member to cause the first clutch member to rotate about the longitudinal axis in response to rotation of the assembly shaft, the actuating means including a fixed hub mounted on the assembly shaft and fixed against rotation about the longitudinal axis, a movable hub mounted for rotation about the longitudinal axis and positioned to lie between the fixed hub and the second clutch member, and camming means on the fixed and movable hubs for axially moving the movable hub along the longitudinal axis and away from the fixed hub to urge the second clutch member into driving engagement with the first clutch member, each of the fixed and movable hubs including a thrust bearing assembly, an annular base wall formed to include a central aperture receiving the assembly shaft therein, a bearing-retaining side wall appended to the annular base wall and arranged to surround the thrust bearing assembly, and a plurality of thin-walled ramp portions spaced about a circumferentially extending edge of the annular base wall and arranged to lie in coextensive relation to the side wall, each of the thin-walled ramp portions on the movable hub engaging one of the thin-walled ramp portions on the fixed hub to establish a camming relationship therebetween.

32. The assembly of claim 31, wherein the first clutch member is a friction cone and the second clutch member is a cone housing formed to include an interior region receiving the friction cone therein during engagement of the friction cone and the cone housing.

33. The assembly of claim 31, wherein each thin-walled ramp portion includes an axially extending edge extending in spaced-apart parallel relation to the longitudinal axis and a diagonally extending cam edge intersecting the axially extending edge and lying at an acute angle relative to the axially extending edge.

34. The assembly of claim 33, wherein each thin-walled ramp portion includes a curved, thin-walled triangular member having the axially extending and diagonally extending edges and having a curved edge appended to an annular perimeter edge of the annular base wall and arranged to interconnect the axially extending and diagonally extending edges.

35. The assembly of claim 31, wherein the side wall includes a plurality of bearing-retaining portions arranged to lie in circumferentially spaced-apart relation about an annular perimeter edge of the annular base wall and to extend in a first direction in spaced-apart parallel relation to the longitudinal axis and the thin-walled ramp portions are arranged to lie in circumferential spaced-apart relation about the annular perimeter edge of the annular base wall and to extend in an opposite second direction in spaced-apart relation to the longitudinal axis.

36. The assembly of claim 35, wherein each bearing-retaining portion is a curved, thin-walled, rectangular member having a pair of spaced-apart axially extending edges and a circumferentially extending edge interconnecting the spaced-apart axially extending edges.

* * * * *